United States Patent
Li et al.

(10) Patent No.: US 10,036,389 B2
(45) Date of Patent: Jul. 31, 2018

(54) MAGNETIC COUPLING UNIT FOR SUBMERSIBLE WELL PUMPS

(71) Applicant: Baker Hughes Incorporated, Houston, TX (US)

(72) Inventors: Yong Li, Owasso, OK (US); Scott C. Strattan, Broken Arrow, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 706 days.

(21) Appl. No.: 14/567,775

(22) Filed: Dec. 11, 2014

(65) Prior Publication Data
US 2016/0168964 A1 Jun. 16, 2016

(51) Int. Cl.
| F04D 13/02 | (2006.01) |
| E21B 43/12 | (2006.01) |
| F04D 13/10 | (2006.01) |
| F04D 29/66 | (2006.01) |
| H02K 49/10 | (2006.01) |

(52) U.S. Cl.
CPC .......... *F04D 13/024* (2013.01); *E21B 43/128* (2013.01); *F04D 13/026* (2013.01); *F04D 13/027* (2013.01); *F04D 13/10* (2013.01); *F04D 29/669* (2013.01); *H02K 49/106* (2013.01)

(58) Field of Classification Search
USPC ............................................. 310/103, 156.81
See application file for complete search history.

(56) References Cited

U.S. PATENT DOCUMENTS

| 4,272,226 A | 6/1981 | Osborne |
| 4,687,054 A | 8/1987 | Russell et al. |
| 5,734,209 A | 3/1998 | Hallidy |
| 5,831,353 A | 11/1998 | Bolding et al. |
| 6,015,270 A | 1/2000 | Roth |
| 6,155,792 A | 12/2000 | Hartley et al. |

(Continued)

FOREIGN PATENT DOCUMENTS

| GB | 2037364 A | 7/1980 |
| GB | 2037364 B | 10/1982 |

OTHER PUBLICATIONS

Reciprocating Submersible Pump Improves Oil Production, JPT—Jul. 2012—www.jptonline.org.

(Continued)

*Primary Examiner* — Kenneth J Hansen
(74) *Attorney, Agent, or Firm* — Bracewell LLP; James E. Bradley

(57) ABSTRACT

An electrical submersible well pump assembly includes a rotary pump and a motor. An inner rotor is coupled to the motor shaft. The inner rotor has steel discs stacked together with end caps at each end. The discs have apertures that align to define axially extending slots. Each of the slots has a closed outer wall spaced radially inward from an outer diameter surface of the inner rotor. Inner rotor magnets are located within the slots. Continuous open and thin gaps between rotating components act as hydrodynamic bearings. Damper bars extend axially at points between the outer walls of the slots and the outer diameter surface of the inner rotor. An outer rotor has a bore that receives the inner rotor, the outer rotor being operatively coupled to the pump shaft for rotation therewith. Outer rotor magnets are mounted to the bore of outer rotor.

13 Claims, 5 Drawing Sheets

(56) References Cited

U.S. PATENT DOCUMENTS

| | | |
|---|---|---|
| 6,283,720 B1 | 9/2001 | Kottke |
| 6,863,124 B2 * | 3/2005 | Araux .................. E21B 43/128 |
| | | 166/105 |
| 6,926,504 B2 | 8/2005 | Howard |
| 7,445,435 B2 | 11/2008 | Howard |
| 7,549,467 B2 | 6/2009 | McDonald et al. |
| 2004/0169431 A1 * | 9/2004 | Sasaki .................. H02K 21/46 |
| | | 310/211 |
| 2014/0069629 A1 | 3/2014 | McCann et al. |
| 2014/0105759 A1 | 4/2014 | Henry et al. |

OTHER PUBLICATIONS

Analytical Design of Permanent Magnet Radial Couplings, Romain Ravaud, Valerie Lemarquand and Guy Lemarquand, IEEE Transactions on Magnetics, vol. 46, No. 11, Nov. 2010; pp. 3860-3865.
Submerged Pumps and Expanders with Magnetic Coupling for Hazardous Applications, Vinod Patel and Steve Rush, Proceedings of the First Middle East Turbomachinery Symposium, Feb. 13-16, 2011, Doha, Qatar, pp. 1-8.
Torque Analysis and Measurements of Cylindrical Air-Gap Synchronous Permanent Magnet Couplings Based on Analytical Magnetic Field Calculations, Jang-Young Choi, Hyeon-Jae Shin, Seok-Myeong Jang, and Sung-Ho Lee, IEEE Transactions on Magnetics, vol, 49, No. 7, Jul. 2013: pp. 3921-3924.

* cited by examiner

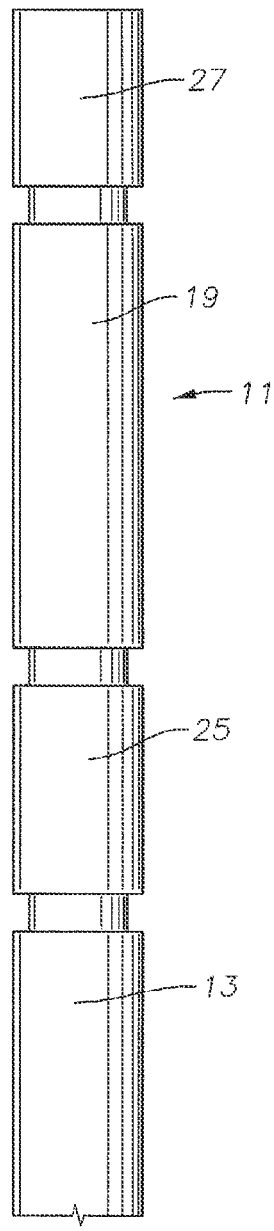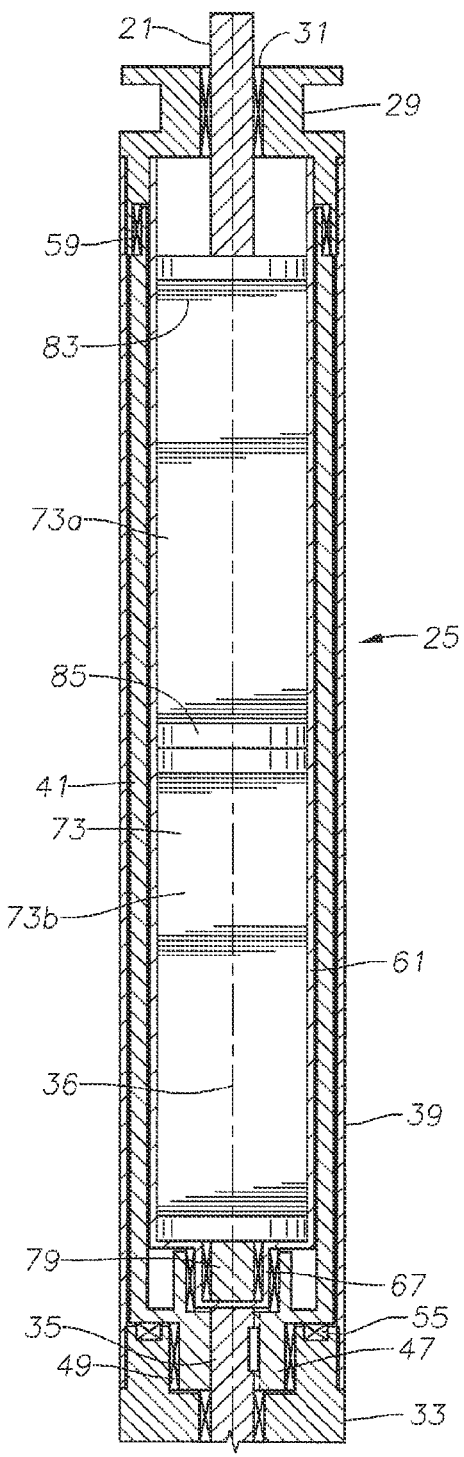
FIG. 1
FIG. 2

MAGNETIC COUPLING UNIT FOR SUBMERSIBLE WELL PUMPS

FIELD OF THE DISCLOSURE

This disclosure relates in general to electrical submersible well pumps and in particular to a magnetic coupling unit between the motor drive shaft and the drive shaft of the pump, the magnetic coupling unit having damper bars to suppress torsional vibration. The magnetic coupling unit also has continuous, open and thin gaps between rotating components, which can act as hydrodynamic journal bearings to support the rotating components, without requiring intermediate bearings. The open, thin gaps also lead to a significant increase in torque density.

BACKGROUND

Many oil wells employ electrical submersible pumps (ESP) to produce well fluid. A typical ESP has a three-phase electrical motor that drives a centrifugal pump. A pressure equalizer or seal section usually will be mounted between the motor and the pump. The seal section has a flexible element, such as a bag or bellows, with well fluid in contact with one side and motor lubricant from the motor on the other side for equalizing the motor lubricant pressure with the hydrostatic well fluid pressure. A drive shaft extends from the motor through the seal section and into the pump for driving the pump. An ESP may be located thousands of feet deep in a well and be quite long, such as 50-100 feet. The motor may generate hundreds of horsepower.

A shaft seal seals around the drive shaft, preventing well fluid from entering the seal section in contact with the lubricant. Well fluid that does encroach into the motor lubricant may eventually migrate into the motor, causing extensive damage. Normally, the shaft seal is a mechanical face seal having a rotating seal element that rotates with the shaft and is urged into contact with a stationary seal element. While long lasting, mechanical face seals usually leak well fluid over time.

Proposals have been made to avoid having a seal on the motor shaft that seals between well fluid and lubricant in the motor. U.S. Pat. No. 6,863,124 discloses a magnet coupling unit for an ESP. The magnetic coupling unit has a shell container that surrounds the motor shaft entirely, including the end of the motor shaft. The shell is filled with motor lubricant and in fluid communication with the motor lubricant in the motor. An inner rotor within the shell rotates with the motor shaft and has magnets on its outer diameter. An outer rotor is coupled to the pump shaft and surrounds the inner rotor. Magnets are located on the inner diameter of the outer rotor. The magnetic fields of the inner and outer rotors pass through the shell and attract to cause the outer rotor to rotate in unison with the inner rotor. ESPs with magnetic couplings are not commercially available at this time.

SUMMARY

This disclosure applies continuous, open and thin gaps in the magnitude of thousandths of an inch between rotating components. The thin gaps act as hydrodynamic bearings to support the rotating components without requiring intermediate bearings. The thin gaps lead to a significant increase in torque density. The greater torque density allows the magnetic coupling to be shorter than if wider gaps and intermediate bearings were employed. The disclosure also shows damper bars to suppress torsional vibration and achieve improved capability to counter de-synchronization in a well with high gas concentration.

An electrical submersible well pump assembly includes a rotary pump having a rotatable pump shaft and a motor having a motor shaft. An inner rotor is operatively coupled to one of the shafts for rotation therewith, the inner rotor having a plurality of slots therein, each of the slots having an outer wall spaced radially inward from an outer diameter surface of the inner rotor. Inner rotor magnets are located within the slots for directing magnetic fields radially inward (south) and outward (north) through the outer walls of the slots. An outer rotor surrounds the inner rotor and is operatively coupled to the other of the shafts for rotation therewith. A plurality of outer rotor magnets mounted to the outer rotor for directing magnetic fields radially inward (south) and outward (north) to attract the magnetic fields of the inner rotor magnets and cause the inner and outer rotors to rotate in unison.

Preferably a plurality of non magnetic, electrically conductive damper bars are employed. Each of the damper bars extends through the inner rotor between the outer wall of one of the slots and the outer diameter surface of the inner rotor. The damper bars are spaced around and parallel to the axis. Preferably, at least two of the damper bars are located between each of the inner rotor magnets and the outer diameter of the inner rotor In the preferred embodiment, each of inner rotor magnets has an outer side that is flat and faces radially outward from the axis.

The inner rotor may comprise a plurality of discs stacked together, each of the discs being of a magnetic material and having apertures that define the slots. The discs are compressed together and retained by end caps at opposite ends of the inner rotor. Each of the damper bars has ends secured to the end caps.

Each of the slots may have flux barrier cavities, each extending outward from side edges of the slot toward but not completely to the outer diameter surface of the inner rotor.

Each of the inner rotor magnets may have parallel flat inner and outer sides. In one embodiment, each of the outer rotor magnets has concentric curved inner and outer sides.

An inner rotor barrier is non rotatably mounted in the outer housing inside of the outer rotor and surrounding the inner rotor. The inner rotor barrier has an outer diameter spaced radially inward from the outer rotor by an intermediate gap. An annular inner gap separates the inner rotor from the inner rotor barrier. An outer gap separates the outer rotor from a non rotating outer housing. A well fluid path that admits well fluid to the outer gap and the intermediate gap. A lubricant fluid path admits lubricant from the motor to the inner gap and interior of the inner rotor barrier.

The inner rotor magnets are arranged in an inner rotor magnet array having one end adjacent the inner rotor motor end and an opposite end adjacent the inner rotor pump end. The inner gap and the intermediate gap are each continuously open and unobstructed throughout a length of the inner rotor magnet array. A motor lubricant pressure equalizer is coupled to the motor for reducing a pressure difference between the motor lubricant and the well fluid surrounding the motor.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

FIG. 1 is a side view of an electrical submersible pump assembly having a magnetic coupling unit in accordance with this disclosure.

FIG. 2 is a partially sectioned view of the magnetic coupling unit of FIG. 1.

DETAILED DESCRIPTION OF THE DISCLOSURE

Figure 3:
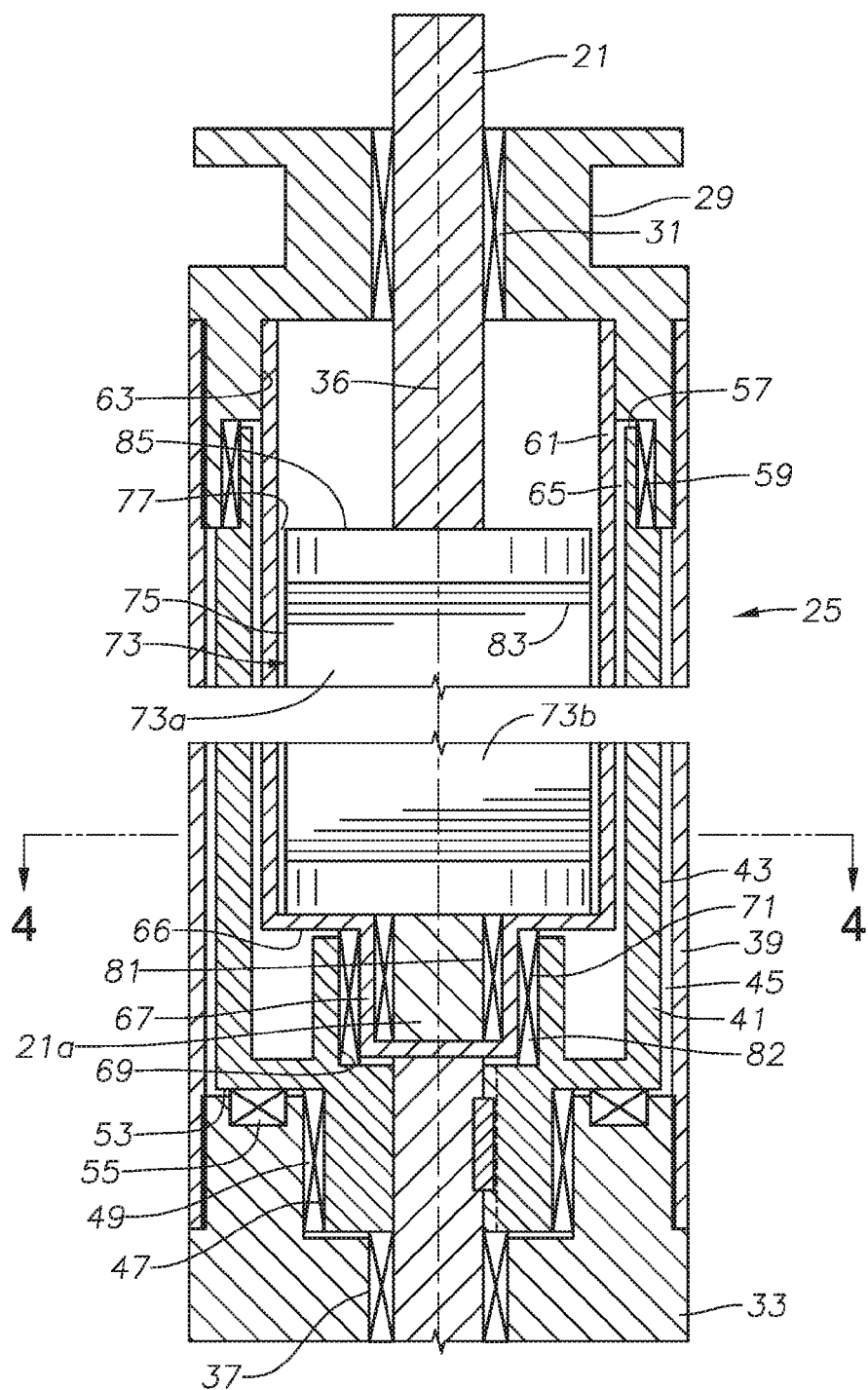
FIG. 3 is an enlarged fragmentary sectional view, of the magnetic coupling unit of FIG. 2 with clearances between the various moving components greatly exaggerated.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, electrical submersible pump assembly (ESP) 15 includes a rotary pump 13. Pump 13 may be a centrifugal pump having a large number of stages, each stage having an impeller and diffuser. Alternately, pump 13 may be another type of rotary pump, such as a progressing cavity pump. Pump 13 has a well fluid intake and a discharge (not shown). ESP 15 is shown oriented vertically, but it could also be operated in inclined or even horizontal sections of a well. Optionally, a gas separator (not shown) may be coupled to pump 13 to separate gas from liquid in the well fluid entering pump 13.

A motor 19, which may be an electrical motor, typically three phase, has a drive shaft 21 (FIG. 2) that drives pump 13. Drive shaft 21 will normally be in sections connected by splined ends. Motor 19 is illustrated as being above pump 13, but it could alternately be mounted below. A thrust bearing (not shown) is mounted in ESP 11 at an appropriate point for handling thrust on shaft 21 caused the operation of pump 13.

A magnetic coupling unit 25, shown in detail in the remaining figures, locates between motor 19 and pump 13 for applying torque from motor shaft 21 to pump 13. Motor 19 will normally be filled with a dielectric liquid or motor lubricant to lubricate the bearings within. A pressure equalizer or expansion chamber 27 has a movable element, such as a bag or bellows, that reduces a pressure differential between the hydrostatic well fluid pressure on the exterior of motor 19 with the pressure of the motor lubricant. In this example, pressure equalizer 27 mounts to an upper end of motor 19 and has interior portions in fluid communication with the motor lubricant in motor 19.

Referring to FIG. 3, magnetic coupling unit 25 has a motor adapter 29 on one end that is non rotatable and secures to motor 19 (FIG. 1). Motor adapter 29 may connect to motor 19 with bolts or a threaded rotatable collar. Motor shaft 21 extends through a bore in motor adapter 29. Radial support bearings 31 around motor shaft 21 in motor adapter 29 provide radial support but do not seal motor lubricant from entering magnetic coupling unit 25.

Magnetic coupling unit 25 has a pump adapter 33 on an opposite end that is non rotatable and secures to pump 13. A pump shaft 35 extending from pump 13 extends through a central opening in pump adapter 33. Pump shaft 35 may comprise separate sections with splined ends coupled together. Pump shaft 35 and motor shaft 21 are coaxial along a longitudinal axis 36. Pump shaft bearings 37 in pump adapter 33 provide radial support for pump shaft 35 but do not seal against the entry of well fluid into magnetic coupling unit 25.

A cylindrical outer housing 39 extends between motor adapter 29 and pump adapter 33. Outer housing 39 is non rotatable and has threaded ends that connect to motor adapter 29 and pump adapter 33.

An outer rotor 41 mounts within outer housing 39 for rotation relative to outer housing 39. Outer rotor 41 has a cylindrical outer diameter surface 43 spaced radially inward from the inner diameter of outer housing 39 by an annular outer gap 45. Outer rotor 41 has a lower neck 47 that is supported within a counterbore in pump adapter 33 by radial support bearings 49. A key 51, spline or the like, couples pump shaft 35 to outer rotor 41 for rotation therewith. Outer rotor 41 has a downward facing shoulder 53 at the base of neck 47 that joins neck 47 to outer rotor outer diameter surface 43. A thrust bearing 55 may be located between shoulder 53 and an upward facing surface of pump adapter 33. Outer rotor 41 has an upper cylindrical end 57 that extends into close proximity, but does not touch, a lower surface of motor adapter 29. A radial bearing 59 radially supports outer rotor upper end 57 within a counterbore formed in an upper surface of motor adapter 29.

A non rotating inner rotor barrier 61 locates within outer rotor 41. Inner rotor barrier 61 is a sleeve or container with a closed end 66 and open end. The open end of inner rotor barrier 61 is rigidly secured within a counterbore 63 of motor adapter 29, such as by welding. An outer diameter of inner rotor barrier 61 is spaced radially inward from outer rotor 41 by an annular intermediate gap 65. Inner rotor barrier 61 has a barrier neck 67 on its closed end 66 that locates within an outer rotor receptacle 69. A receptacle bearing 71 provides radial support for barrier neck 67 and allows rotation of outer rotor 41 relative to the non rotating inner rotor barrier 61. Barrier neck 67 has a closed end. An end of pump shaft 35 is axially spaced a short distance from the closed end of barrier neck 67. Inner rotor barrier 61 is formed of a rigid, non magnetic material, which could be a metal with low conductivity, such as Hastelloy or a ceramic polymer composite material. The cylindrical sidewall of inner rotor barrier 71 is thin, for example 0.060 to 0.100 inches in radial thickness.

Magnetic coupling unit 25 has an inner rotor 73 carried within inner rotor barrier 61. Inner rotor 73 rotates relative to inner rotor barrier 61. Inner rotor 73 has a cylindrical outer diameter surface 75 spaced radially inward from inner rotor barrier 61 by an annular inner gap 77. Motor shaft 21 joins inner rotor 73 and preferably extends through inner rotor 73 with an end 21*a* protruding from an end of inner rotor 73 into a receptacle 81 formed by inner rotor barrier neck 67. Bearings 82 within receptacle 81 provide radial support for the motor shaft end 21*a*.

Annular outer gap 45, intermediate gap 65 and inner gap 77 are much smaller than they appear in the drawing. Preferably, the radial width of each gap 45, 65 and 77 is in the range from about 0.010 inch to 0.020 inch. The thickness of the sidewall of inner rotor barrier 61 may be greater than the sum of the widths of inner gap 77 plus intermediate gap 65.

As explained subsequently, gaps 45, 65 and 77 will be filled with liquid. Outer rotor 41 rotates relative to outer housing 39 and inner rotor barrier 61. Preferably, there are no intermediate bearings located in outer gap 45 between bearings 59 and shoulder 55. Preferably, there are no intermediate bearings located in intermediate gap 65 between motor adapter 29 and inner rotor barrier closed end 66. Preferably, there are no intermediate bearings along the length of inner rotor sidewall 75. Each gap 45, 65 and 77 is continuously open and unobstructed throughout its length. In this embodiment, each gap 45, 65, and 77 has a constant width throughout its length. The liquid in outer gap 45 and intermediate gap 65 and the small clearances of outer gap 45 and intermediate gap 65 can form hydrodynamic journal bearings and provide radial support for outer rotor 41. Similarly, the liquid in inner gap 77 and the small clearance or width of inner gap 77 provide radial support for inner rotor 73.

Figure 6:
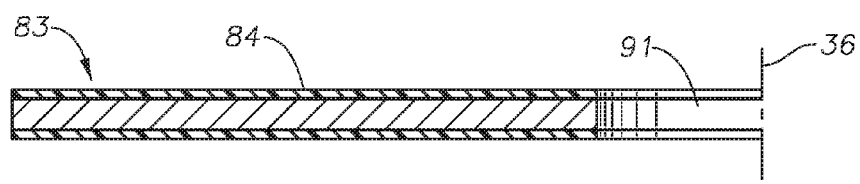
FIG. 6 is a side view of a portion of the disc of FIG. 5, with thicknesses of the coating and the disc greatly exaggerated.

In the preferred embodiment, inner rotor 73 is made up from a large number of flat, thin laminations or discs 83 stacked together. However, inner rotor 73 could be formed of a single block of material, such as one formed of a soft magnetic composite. Discs 83 are preferably formed from a magnetic, electrically conductive material such as steel. As schematically illustrated in FIG. 6, each disc 83 has a paint or coating 84 of an electrically non conductive material. Disc 83 and coating 84 are much thinner than illustrated in FIG. 6.

Also, preferably inner rotor 73 comprises a plurality of segments or sections in abutment with each other. Each inner rotor segment has an end cap 85 at each end, and the discs 83 are retained between in compression. In this example, two inner rotor segments 73*a*, 73*b* are illustrated, but there likely would be more. The length of each inner rotor segment 73*a*, 73*b*, may be about 12 to 18 inches, as an example, while the total length of inner rotor 73 may be 6-8 feet. As shown in FIG. 2, adjacent end caps 85 abut each other when inner rotor 73 is assembled. End caps 85 are flat plates, normally of a non magnetic electrically conductive material such as copper, are much thicker than discs 83.

Figure 4:
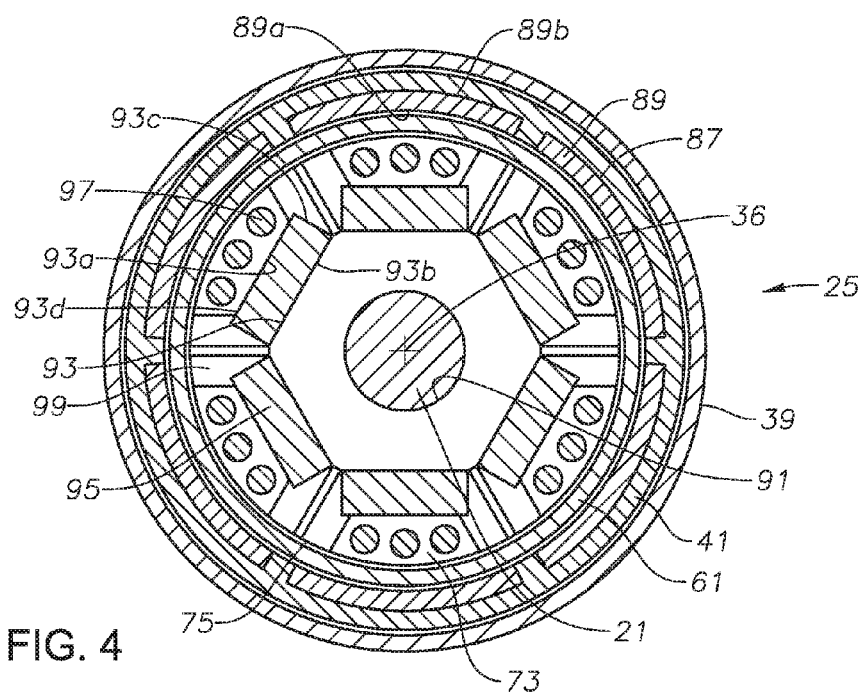
FIG. 4 is a sectional view of the magnetic coupling unit of FIG. 3, taken along the line 4-4 of FIG. 3 and shown while the motor and pump are not operating.

Outer rotor 41 may also be formed of laminations or discs similar to discs 83. Referring to FIG. 4, outer rotor 41 has a number of outer rotor magnets 89 spaced around its bore and located within outer rotor recesses 87. Normally, each outer rotor magnet 89 comprises a number of magnets stacked end to end along the axial length of outer rotor 41. Preferably, each outer rotor magnet 89 has a curved inner side 89*a* and curved outer side 89*b*. In this embodiment, inner side 89*a* and outer side 89*b* are arcuate segments of concentric cylinders, each having a center point at axis 36. Inner sides 89*a* of outer rotor magnets 89 define the inner diameter of outer rotor 41. The side edges of outer rotor magnet recesses 87 are circumferentially spaced apart from each other a short distance. The polarities of outer rotor magnets 89 alternate with one around the circumference of outer rotor 41, with the south poles being at the upper end of every other outer rotor magnet 89 and the north poles being at the ones between.

Figure 5:
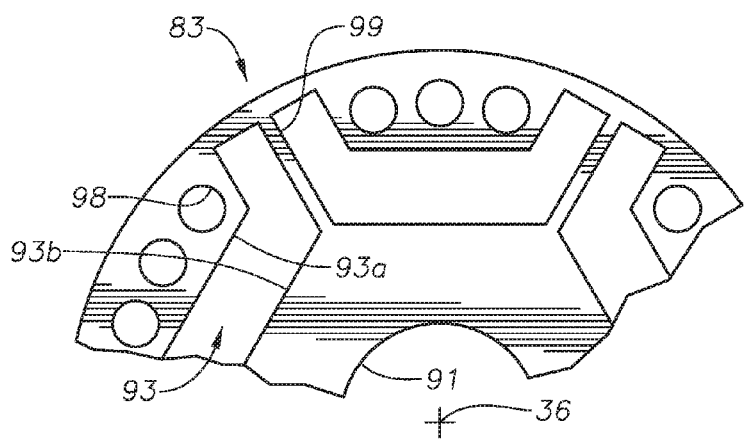
FIG. 5 is a plan view of a portion of one of the discs of the inner rotor of the magnetic coupling unit of FIG. 4, shown removed from the inner rotor.

Inner rotor 73 has a central opening 91 through which motor shaft 21 extends. A key or the like within central opening 91 causes inner rotor 73 to rotate with motor shaft 21. Inner rotor 73 has a plurality of slots 93 spaced circumferentially around central opening 91. As shown also in FIG. 5, slots 93 are formed by apertures stamped in each disc 83 and extend axially from one end cap 85 to the other of each inner rotor segment 73*a*, 73*b* (FIG. 2). Slots 93 are located radially outward and separated from central opening 91. Slots 93 are also located radially inward and separated from inner rotor outer diameter 75. In this example, slots 93 are closer to inner rotor outer diameter 75 than to central opening 91. Preferably, the number of slots 93 equals the number of outer rotor magnets 89.

Each slot 93 has an outer wall 93*a* and an inner wall 93*b*. In this embodiment, outer and inner walls 93*a*, 93*b* are flat and parallel to each other. A radial line emanating from axis 36 is normal to outer and inner walls 93*a*, 93*b*. An inner rotor magnet 95 fits within each inner rotor slot 93. Each inner rotor magnet 95 has a rectangular cross sectional configuration with a flat outer face and a flat, parallel inner face. Each rotor magnet 95 normally comprises a number of magnets stacked end on end within each slot 93. The polarity of inner rotor magnets 95 alternates with adjacent inner rotor magnets 95 circumferentially around inner rotor 73. The north pole end will be at one end of every other inner rotor magnet 95. Inner rotor magnets 95 are oriented to direct a magnetic field outward that attracts and interacts with the inward directed magnetic fields of outer row magnets 89. The magnetic fields pass through inner gap 77, inner rotor barrier 61 and intermediate gap 65. Outer rotor magnets 89 and inner rotor magnets 95 are strong, permanent magnets, such as rare earth types. Placing the inner rotor magnets 95 within slots 93 allows magnets of rectangular cross-section to be utilized, which typically are less expensive than curved magnets, such as outer rotor magnets 89.

Figure 7:
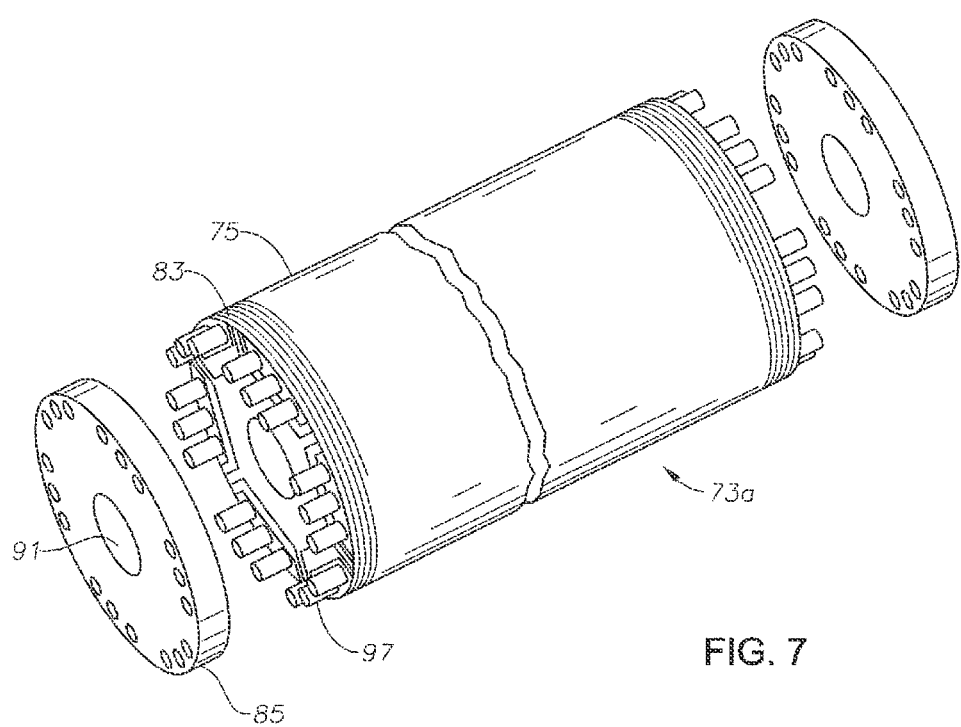
FIG. 7 is a perspective, exploded view of one of the inner rotor segments of the magnetic coupling unit of FIG. 3, showing the end caps disassembled from the damper bars.

Damper bars 97 extend through holes 98 (FIG. 5) in each rotor segment 73*a*, 73*b*. Damper bars 97 comprise rods, which may be cylindrical, spaced around inner rotor central opening 91 radially outward from slots 93 and inward from inner rotor outer diameter surface 75. Preferably at least two damper bars 97 (three shown) are located within a bridge portion of inner rotor 73 between each slot 93 and inner rotor outer diameter surface 75. The damper bars 97 outward from each slot 93 are spaced circumferentially apart from each other to allow magnetic flux from the nearby inner rotor magnet 95 to pass around and between them. Preferably, damper bars 97 are of a non metallic electrically conductive material, such as copper. As illustrated in FIG. 7, damper bars 97 extend the full length of each rotor segment 73*a* or 73*b* and have opposite ends joined to end caps 85, such as by welding or brazing. In addition to dampening torque fluctuations, damper bars 97 retain the stack of discs 83 of each rotor segment 73*a*, 73*b* in compression between end caps 85 and provide structural strength.

Referring again to FIGS. 4 and 5, a flux barrier cavity 99 extends outward from each slot side edge to a point near but recessed inward from inner rotor outer diameter outer surface 75. Each flux barrier cavity 99 is separated from the nearest flux barrier cavity 99 of an adjacent slot 93. Each flux barrier cavity 99 extends generally outward along a radial line from axis 36. Each flux barrier cavity 99 has a width that may vary, and is shown to be about the same as the distance from slot inner wall 93*b* to slot outer wall 93*a*. In this embodiment, there will be twice as many flux barrier cavities 99 as there are inner rotor magnets 95. The sides of inner rotor magnets 95 do not extend into flux barrier cavities 99, which remain open. Flux barrier cavities 99 serve to direct the magnetic fields of the adjacent magnet radially outward.

Referring to FIGS. 3 and 4, each inner rotor magnet 95 extends the full axial distance of one of the rotor segments 73*a, b* from one end cap 85 to the other. When the separate rotor segments 73*a, b* are assembled on motor axis 21, a lower end of each inner rotor magnet 95 in the lowermost rotor segment 73*a, b* will be adjacent the pump end of inner rotor 73, and an upper end of each inner rotor magnet 95 in the uppermost rotor segment 73*a, b* will be at the motor end of inner rotor 73. Inner rotor magnets 95 define an inner rotor magnet array that extends axially from the pump end of inner rotor 73 to the motor end of inner rotor 73. The magnetic field of the inner rotor magnet array is interrupted only by end caps 85 intermediate the ends of inner rotor 73. The total axial length of the array of outer rotor magnets 89 is at least equal to the total axial length of the array of inner rotor magnets 95.

The magnetic fields act across a total gap equal to the radial widths of intermediate gap 65 plus inner gap 77 and the thickness of the cylindrical sidewall of inner rotor barrier 61. The amount of torque that may be transmitted from inner rotor 73 to outer rotor 41 is a function of the total gap. The smaller the total gap, the greater the torque density. Consequently, keeping intermediate gap 65 and inner gap 77 as small as possible increases the torque density If one or more intermediate bearings were located within the inner gap 77 and the intermediate gap 65, the widths of these gaps would have to be greater to accommodate the intermediate bearings. A unit with intermediate bearings would thus have to be longer than the magnetic coupling unit 25 disclosed in order to achieve the same torque requirements. Using very thin gaps 65, 77 that are open, free of obstruction and constant in width over at least the length of the inner rotor magnet array allows the inner rotor 73 and outer rotor 41 to serve as bearings themselves even over a length that may be up to 6-8 feet.

The magnetic fields do not cross outer gap 45. However, to maintain the outer diameter of outer housing 39 as small as possible, preferably, there are no intermediate bearings along outer gap 45 so that the outer diameters of inner rotor 73 and outer rotor 41 can be as large as possible with a desired torque density. Preferably, outer gap 45 is continuously open, unobstructed and constant in width over at least the length of the outer sidewall surface 43 of outer rotor 41.

In operation, ESP 11 will be suspended in a wellbore. Referring to FIG. 3, motor lubricant will fill inner rotor barrier 61, immersing inner rotor 73 in the lubricant. Motor shaft bearing 31 does not seal, which places the motor lubricant in inner rotor barrier 61 in fluid communication with the motor lubricant in motor 19 (FIG. 1) and at the same pressure. Pressure equalizer 27 (FIG. 1) equalizes the motor lubricant pressure with the hydrostatic pressure of the well fluid in the well. Well fluid is free to migrate past pump shaft bearings 37 and outer rotor bearings 49, 55 into outer annular gap 45. Well fluid is also free to migrate around pump shaft 35 and through receptacle bearings 71 into intermediate gap 65. Well fluid will thus be located on both the inner and outer sides of outer rotor 41. The well fluid in this area will be substantially at the hydrostatic pressure of the well fluid on the exterior of magnetic coupling unit 25.

When powered, motor 19 (FIG. 1) rotates motor shaft 21, which in turn rotates inner rotor 73 in unison. The rotational speed can vary, but many submersible centrifugal pumps 13 operate at about 3600 rpm. The attraction of the magnetic fields of inner rotor magnets 95 and outer rotor magnets 89 (FIG. 4) causes outer rotor 41 to rotate. The inner rotor magnets 95 with north poles at the upper ends are attracted to the outer rotor magnets 89 with south poles at the upper ends. Outer rotor 41 rotates pump shaft 35, which drives pump 13 to pump well fluid.

Figure 8:
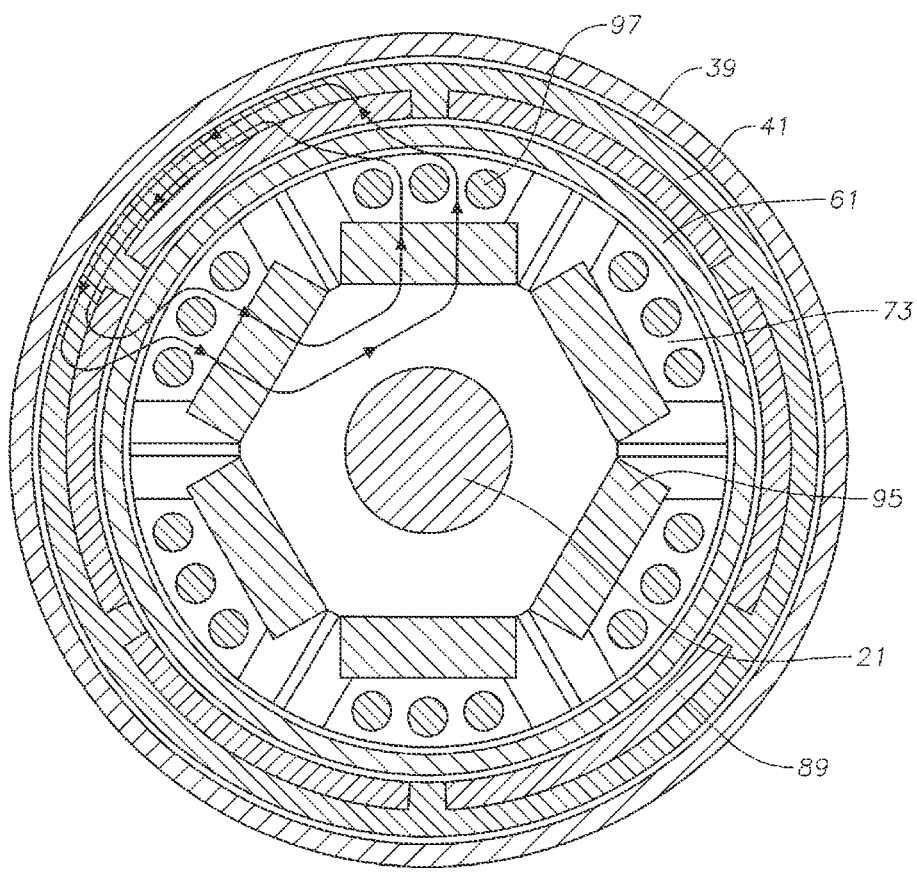
FIG. 8 is a sectional view similar to FIG. 4, but showing the components during a typical loaded condition of the motor and the pump, and also illustrating the magnetic flux distribution.

The torque required to drive pump 13 can cause a load angle or phase lag between outer rotor 41 and inner rotor 73. FIG. 8 shows a phase lag under maximum load conditions as well as flux lines of the interacting magnetic fields of an inner 95 and an outer magnet 89. While not operating, a radial line (not shown) extending from axis 36 passes through a centerline of each inner rotor magnet 95 and the related outer rotor magnet 89 as shown in FIG. 4. While under maximum load, a radial line passing through a centerline of one of the inner rotor magnets 95 will be rotationally offset relative to the centerline of a mating outer rotor magnet 89. The load angle could be, for example, about 30 degrees, which is also the maximum allowable load angle for a six pole magnetic coupling. When the pump load is maintained constant, the load angle is also a constant below the maximum allowable load angle. The closer to the maximum allowable load angle, the more torque is transferred by the magnetic coupling. For a constant load condition, preferably the magnetic couple will have a nominal load angle that operates close to the maximum allowable load angle. While the pump load fluctuates around a nominal load level, the load angle will vary around the nominal load angle, creating vibration and ripples, particularly when encountering large quantities of gas in the well fluid.

The nominal load angle should not be designed at the maximum allowable load angle because any small torque disturbance around the nominal value can cause de-synchronization of inner rotor magnets 95 with outer rotor magnets 89, wherein inner rotor magnets 95 will shift and align with different outer rotor magnets 89 than initially. It may be aligned, but the alignment will not be stabilized due to the varying torque. If de-synchronized again, the inner rotor magnet 95 will try to align with the flowing outer rotor magnet 89, again and again. The magnetic coupling will not produce torque under frequent aligning and de-synchronization.

Dampening can help to reduce the torque ripple or oscillations. When a load angle begins to fluctuate around a nominal value, eddy currents begin in damper bars 97, consuming some of the vibration energy. When there is no load angle fluctuation, there should be no eddy currents generated in damper bars 97. The eddy currents increase and decrease in response to changes in the load angle and torque requirements, thereby dampening or reducing the variations in the load angle. The dampening reduces vibration and the chances of de-synchronization.

While the disclosure has been described in only one of its forms, it should be apparent to those skilled in the art that various changes may be made. For example, the motor could be located below the magnetic coupling unit and the pump above.

The invention claimed is:

1. An electrical submersible well pump assembly, comprising:
   a rotary pump having a rotatable pump shaft;
   a motor having a motor shaft that is rotated by the motor and extends along an axis of the pump assembly;
   a magnetic coupling unit, comprising:
   an inner rotor operatively coupled to one of the pump or motor shafts for rotation therewith, the inner rotor having a plurality of slots therein, each of the slots having an outer wall spaced radially inward from an outer diameter surface of the inner rotor;
   a plurality of inner rotor magnets, each located within one of the slots;
   an outer rotor surrounding the inner rotor and operatively coupled to the other of the pump or rotor shafts for rotation therewith;
   a plurality of outer rotor magnets mounted to the outer rotor to attract magnetic fields of the inner rotor magnets and cause the inner and outer rotors to rotate in unison;
   a plurality of non magnetic, electrically conductive damper bars, each of the damper bars extending through the inner rotor between at least one of the inner rotor magnets and the outer diameter surface of the inner rotor, the damper bars being spaced around and parallel to the axis; and wherein
   each of the slots has side edges that extend outward from the inner rotor magnet contained therein toward but not completely to the outer diameter surface of the inner rotor, defining flux barrier cavities, at least one of the damper bars being located between the flux barrier cavities of one of the slots.

2. The assembly according to claim 1, wherein:
   each of the inner rotor magnets has an outer side that is flat and faces radially outward from the axis.

3. The assembly according to claim 1, wherein:
   at least two of the damper bars are located between each of the inner rotor magnets and the outer diameter of the inner rotor.

4. The assembly according to claim 1, wherein the inner rotor comprises:
   a plurality of discs stacked together, each of the discs being of a magnetic material and having apertures that define the slots.

5. The assembly according to claim 1, further comprising:
   end caps at opposite ends of the inner rotor; and
   wherein each of the damper bars has opposite ends secured to the end caps.

6. The assembly according to claim 1, wherein:
   each of the inner rotor magnets has parallel flat inner and outer sides; and
   each of the outer rotor magnets has concentric curved inner and outer sides.

7. An electrical submersible well pump assembly, comprising:
   a rotary pump having a rotatable pump shaft;
   a motor having a motor shaft that is rotated by the motor and extends along an axis of the pump assembly;
   a magnetic coupling unit, comprising:
   an inner rotor operatively coupled to one of the pump or motor shafts for rotation therewith, the inner rotor having a plurality of slots therein, each of the slots having an outer wall spaced radially inward from an outer diameter surface of the inner rotor;
   a plurality of inner rotor magnets, each located within one of the slots;
   an outer rotor surrounding the inner rotor and operatively coupled to the other of the pump or motor shafts for rotation therewith;
   a plurality of outer rotor magnets mounted to the outer rotor to attract the magnetic fields of the inner rotor magnets and cause the inner and outer rotors to rotate in unison; wherein:
   the inner rotor comprises a plurality of inner rotor segments in axial abutment with each other, each of the segments comprising a plurality of steel discs stacked together, each of the discs having apertures that define the slots and a periphery that defines an outer diameter of each of the inner rotor segments;
   a plurality of non magnetic, electrically conductive damper bars in each of the inner rotor segments, each of the damper bars extending through holes provided in the discs at a location between the outer wall of one of the slots and the outer diameter of the inner rotor segment, the damper bars being spaced around and parallel to the axis; and
   end caps on opposite ends of each of the rotor segments, the damper bars extending to and being joined to each of the end caps.

8. An electrical submersible well pump assembly, comprising:
   a rotary pump having a rotatable pump shaft;
   a motor having a motor shaft that is rotated by the motor and extends along an axis of the pump assembly;
   an inner rotor having an inner rotor shaft operatively coupled to the motor shaft for rotation therewith, the inner rotor comprising a plurality of inner rotor segments, each of the segments comprising steel discs stacked together with end caps at each end of each of the inner rotor segments;
   the discs having apertures that align to define axially extending slots therein, the slots being spaced apart from each other around the inner rotor shaft, each of the slots having an inner wall and an outer wall, the inner wall being spaced radially outward from the inner rotor shaft, the outer wall being spaced radially inward from an outer diameter surface of the inner rotor;
   a plurality of inner rotor magnets located within the slots, the inner rotor magnets defining an inner rotor magnet array that extends from a pump end of the inner rotor to a motor end of the inner rotor;
   a plurality of damper bars extending axially along each of the inner rotor segments and spaced apart from each other around the inner rotor shaft, the damper bars being located between the outer walls of the slots and the outer diameter surface of the inner rotor, each of the damper bars being formed of an electrically conductive, non magnetic material and having ends connected to the end caps;
   an outer rotor having a bore that receives the inner rotor, the outer rotor being operatively coupled to the pump shaft for rotation therewith; and a plurality of outer rotor magnets mounted to the bore of outer rotor to interact with magnetic fields of the inner rotor magnets and cause the inner and outer rotors to rotate in unison.

9. The assembly according to claim 8, further comprising:
a plurality of flux barrier cavities, each extending outward from a side edge of one of the slots toward but not completely to the outer diameter surface of the inner rotor.

10. The assembly according to claim 8, further comprising:
an outer housing surrounding the outer rotor, the outer housing being non rotatable relative to the motor shaft and the pump shaft and having a motor adapter and a pump adapter;
the outer rotor being separated from the outer housing by an annular outer gap;
a non rotating inner rotor barrier surrounding the inner rotor, the inner rotor barrier having a cylindrical sidewall located between the outer rotor and the inner rotor, the inner rotor barrier being separated from the outer rotor by an annular intermediate gap, the inner rotor barrier begin separated from the inner rotor by an annular inner gap;
the inner rotor barrier having a closed pump end and an open motor end configured for receiving lubricant from the motor through the motor adapter of the outer housing into the inner gap and into the inner rotor barrier;
the intermediate and the outer gaps being configured to receive from the pump end of the outer housing well fluid in which the assembly is immersed;
the inner gap and the intermediate gap having axial lengths at least equal to an axial length along the inner rotor of the inner magnet array; and
the inner gap and the intermediate gap being open and unobstructed for an axial length at least equal to an axial length of the inner magnet array.

11. The assembly according to claim 8, further comprising:
an outer housing surrounding the outer rotor, the outer housing being non rotatable relative to the motor shaft and the pump shaft and having a motor adapter and a pump adapter;
the outer rotor being located in and rotatable relative to the outer housing, the outer rotor being separated from the outer housing by an annular outer gap;
an inner rotor barrier surrounding the inner rotor, the inner rotor barrier having a cylindrical sidewall located between the outer rotor and the inner rotor, the inner rotor barrier being separated from the outer rotor by an annular intermediate gap, the inner rotor barrier being separated from the inner rotor by an annular inner gap;
the inner rotor barrier having a closed pump end and an open motor end configured for receiving lubricant from the motor through the motor adapter of the outer housing into the inner gap and into the inner rotor barrier;
the intermediate and the outer gaps being configured to receive from the pump end of the outer housing well fluid in which the assembly is immersed;
inner rotor radial support bearings at opposite ends of the inner rotor; wherein
the inner gap is continuous and open from one of the inner rotor radial support bearings to the other of the inner rotor radial support bearings;
outer rotor radial support bearings at opposite ends of the outer rotor; and
wherein the outer and the intermediate gaps are continuous and open from one of the outer rotor radial support bearings to the other of the outer rotor radial support bearings.

12. The assembly according to claim 8, wherein:
each of the inner rotor magnets has an inner side and an outer side that are flat and parallel to each other.

13. The assembly according to claim 8, further comprising:
a non conductive coating on opposite sides of each of the discs.

* * * * *